United States Patent [19]

Fitzwater

[11] 4,090,589

[45] May 23, 1978

[54] FAIL SAFE VALVE ACTUATOR

[76] Inventor: John Herman Fitzwater, 160 Vancouver Ave., Warwick, R.I. 02886

[21] Appl. No.: 625,264

[22] Filed: Oct. 23, 1975

[51] Int. Cl.² .................... F16D 13/02; G05G 17/00; F03G 1/00

[52] U.S. Cl. ...................................... 185/40 R; 74/2; 92/13.6; 92/136; 92/143; 188/304; 188/317; 251/54; 251/69; 251/71

[58] Field of Search .............. 185/40 R; 192/26, 41 S; 92/136, 138, 8, 143, 13.6; 251/54, 69, 71; 188/302, 304, 317; 74/2

[56] References Cited

U.S. PATENT DOCUMENTS

| 238,551 | 3/1881 | Barlow | 188/317 X |
|---|---|---|---|
| 718,037 | 1/1903 | Toennes | 188/317 X |
| 1,493,884 | 5/1924 | Kreider | 188/304 |
| 1,944,689 | 1/1934 | Heverly | 188/304 |
| 2,015,758 | 10/1935 | Moulton | 188/317 |
| 2,723,013 | 11/1955 | Rogers et al. | 192/41 S |
| 2,883,022 | 4/1959 | Clausing et al. | 192/26 |
| 3,028,726 | 4/1962 | Jenkins et al. | 185/40 R |
| 3,104,745 | 9/1963 | Wipke | 192/26 X |
| 3,156,160 | 11/1964 | Meyer et al. | 92/13.6 |
| 3,225,875 | 12/1965 | Thomas et al. | 192/26 |
| 3,808,895 | 5/1974 | Fitzwater | 251/71 X |

FOREIGN PATENT DOCUMENTS 1,202,884   7/1959   France ................. 188/317

Primary Examiner—Allan D. Herrmann
Attorney, Agent, or Firm—Hill, Gross, Simpson, Van Santen, Steadman, Chiara & Simpson

[57] ABSTRACT

A valve actuator employs a torsion spring type clutch to engage and disengage a drive motor and an output shaft. The torsion spring normally engages and is connected to a gear which may be engaged by a dog to cause disengagement of the clutch. The output shaft carries a pinion which is engaged with a rack carried on a piston which is slidable in a closed fluid containing cylinder. The piston includes an axial passageway with a metering orifice therein which smoothes the operation of the actuator and provides positive stops for the output shaft with a minimization of impact between the piston and the ends of the cylinder.

15 Claims, 6 Drawing Figures

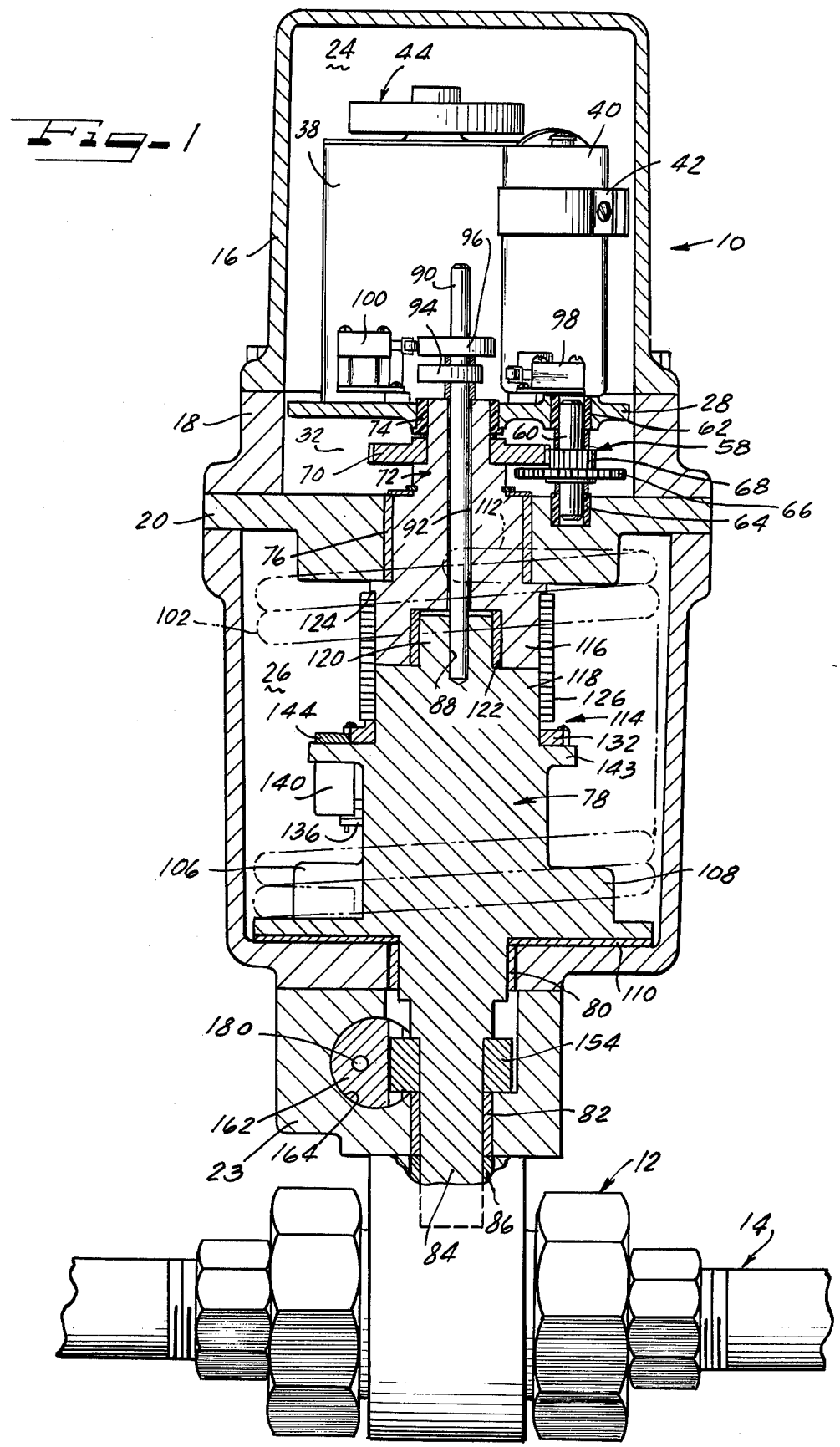

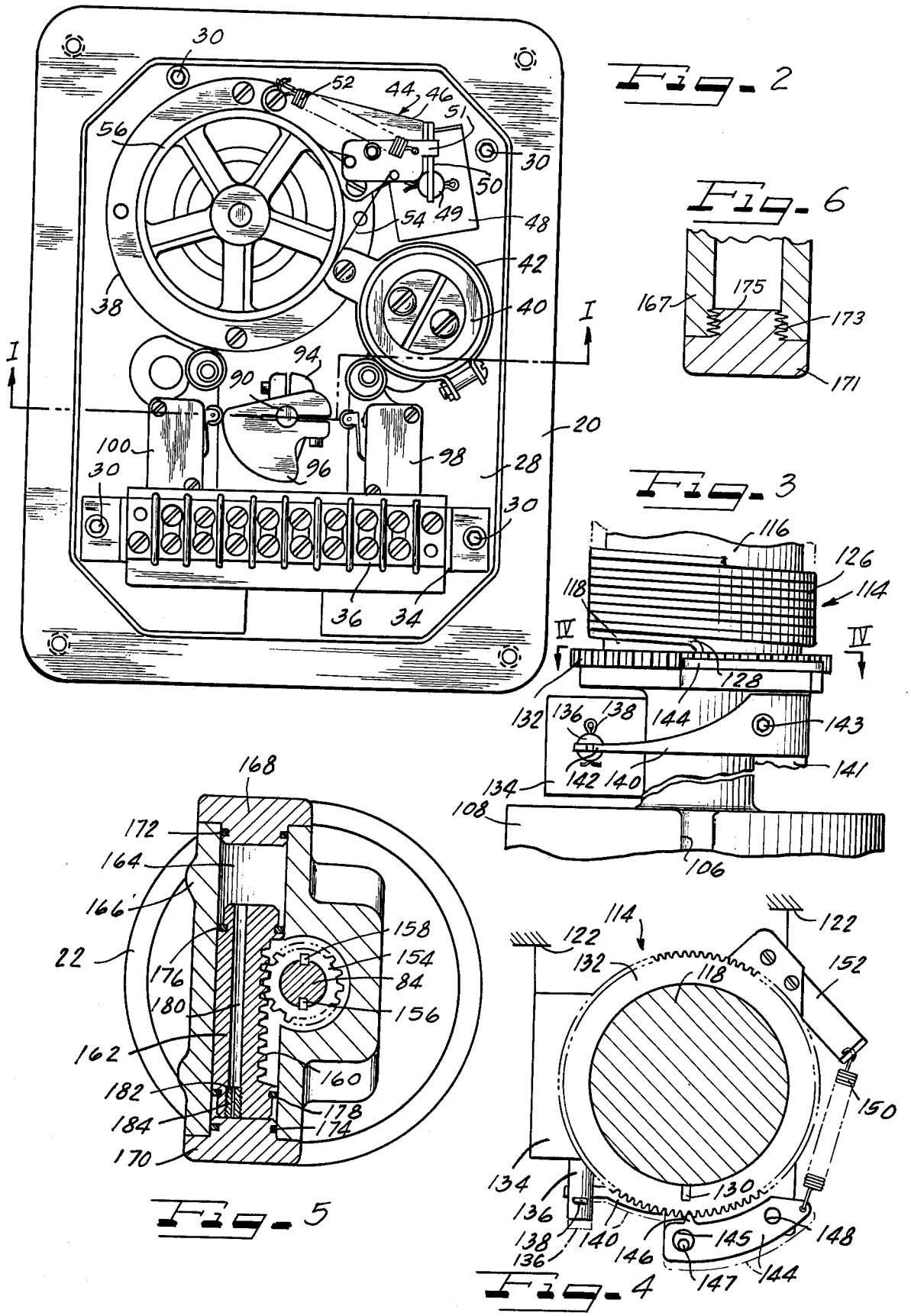

FAIL SAFE VALVE ACTUATOR

BACKGROUND OF THE INVENTION

1. Field of the Invention

This invention relates to valve actuators, and is more particularly concerned with fail-safe valve actuators in which a torsion spring is wound during operation of the valve in a first direction to store energy for returning the valve in the opposite direction upon disconnection of power from the actuator, such disconnection being either intentional or by way of power failure or the like.

2. Description of the Prior Art

In my U.S. Pat. No. 3,808,895, issued May 7, 1974, I disclose an electric fail-safe valve actuator of the type generally mentioned above. The actuator comprises an electric motor which is coupled to an output shaft by way of a gear train and an intermediate shaft. The intermediate shaft and the output shaft are axially aligned and have adjacent ends embraced by a torsion spring which enages or releases the two shafts, with respect to mutual rotation, through the energization and deenergization of a solenoid which encircles the output shaft and which has an annular cup-shaped operating member which moves axially along the shaft to engage and disengage the torsion spring. A second torsion spring has one end connected to the housing of the actuator and the other end connected to the output shaft so as to be wound to store energy during driving of the output shaft in a first direction. A brake mechanism connected to the motor holds the valve in its operated condition until such time as power is deliberately or accidentally removed from the circuit, whereupon the torsion spring clutch mechanism disengages the intermediate and output shafts and the second torsion spring, acting as a motor, releases its energy to drive the valve in the opposite direction. A pin connected to the output shaft and traveling in an arcuate slot in a fixed plate strikes a bumper at the end of the slot as a stop and limit defining structure.

SUMMARY OF THE INVENTION

Although my electric fail-safe valve actuator disclosed in the aforementioned patent operates satisfactorily for its intended purpose, I have found that an improved clutch mechanism of a much simpler design and operating on the same general principle is much easier to manufacture and install. I have also determined that a smoother operation of the valve may be obtained through the utilization of a fluid damping mechanism which, at the same time, provides a softer impact at positively defined stops.

Therefore, the primary object of the invention is to provide an improved fail-safe valve actuator of simpler construction and more ease of fabrication.

Another object of the invention is to provide a fail-safe valve actuator in which there is less danger of breakage of the components thereof due to impact and wear then in my previous design.

According to the invention, an intermediate shaft driven by an electric drive motor is axially aligned with the output shaft of the valve actuator. A torsion spring embraces adjacent ends of the intermediate and output shafts and has a normal diameter that is less than the diameter of the adjacent portions of the intermediate and output shafts. One end of the spring is connected to a gear which abuts, but is somewhat free to rotate about the output shaft so that upon the driving of the output shaft in a first direction the spring couples the shafts for mutual rotation. A large torsion spring is connected at one end to the housing of the actuator and at the other end to the output shaft so as to store energy during the driving operation. Upon disconnection of power, whereupon the last-mentioned spring releases its energy to drive the output shaft and the valve in the opposite direction, a solenoid operates a level arm to engage a dog on the arm with the gear of the clutch mechanism. Upon relative rotation of the output shaft with respect to the intermediate shaft, the clutch spring, held by the dog and gear arrangement, releases the coupling between the two shafts so that the output shaft and valve are driven by the large torsion spring without being loaded by the drive motor and its gear train.

The housing includes a fluid cylinder capped at each end and positioned adjacent the output shaft. The output shaft carries a pinion which engages a rack formed on a piston which is slidably mounted in the cylinder. The piston includes an axial passageway for metering a flow of fluid therethrough to smooth out and damp the operation of the actuator. The passageway may include a threaded portion having a plug therein with a metering orifice, so that a plurality of such plugs with different size orifices may be interchangeably utilized to control the amount of damping. The cylinder has end caps sealed thereto which form positive stops for the ends of the cylinders as the actuator operates in one direction or the other. The end caps may be threaded for adjusting the stops in accordance with particular applications.

BRIEF DESCRIPTION OF THE DRAWINGS

Other objects, features and advantages of the invention, its organization, construction and operation will be best understood from the following detailed description of preferred embodiments thereof taken in conjunction with the accompanying drawings, on which:

FIG. 1 is an elevational view of an actuator connected to a valve, the view being sectional and taken generally along the lines I—I of FIG. 2;

FIG. 2 is a top plan view with the cover removed of the apparatus illustrated in FIG. 1;

FIG. 3 is an elevational view of the clutch mechanism constructed in accordance with the present invention;

FIG. 4 is a sectional view taken generally along the lines IV—IV of FIG. 3;

FIG. 5 is a sectional view of a portion of the apparatus illustrated in FIG. 1 taken generally along the lines V—V; and FIG. 6 is a fragmentary sectional view illustrating threaded end caps as adjustable stops.

DESCRIPTION OF THE PREFERRED EMBODIMENTS

The overall construction of the valve actuator illustrated and discussed herein is substantially the same as that in my aforementioned U.S. Pat. No. 3,808,895 and details herein which correspond to details disclosed in that patent may not be discussed herein, or only in a general manner. Therefore, my aforementioned patent and the disclosure thereof is fully incorporated herein by this reference.

Referring now to FIGS. 1 and 2, an actuator is generally illustrated at 10 connected to a valve 12, which may be any rotary operated valve such as a ball valve, the valve 12 being serially interposed in a conduit 14.

The actuator 10 comprises an upper housing portion or cover 16, a ring cover adapter 18, a top plate 20, a lower housing 22, and a cylinder housing 23.

The top plate 20 generally divides the actuator housing into two chambers 24 and 26. The chamber 24 generally houses the electrical components of the actuator and those mechanical components associated with the electrical drive motor, while the chamber 26 generally houses the output shaft and those components associated with coupling and uncoupling the electric drive motor and the output shaft, and those components associated with the spring motor of the actuator.

A gear case plate 28 is mounted in the upper chamber 24 for supporting the electrical components and acting as a bearing support structure for the gear train which extends between the electric drive motor and the output shaft. The gear case plate 28 may be secured to the top plate 20 by means of suitable fastening means such as the screws 30 which extend from the gear case plate 28 to the top plate 20, as indicated at 32 (FIG. 1).

One or more of the screws 30 may also secure a bracket 34 to the gear case plate 28 for carrying a terminal board 36 which serves as an electrical distribution element between an incoming electrical supply line (not shown) and the electrical components of the actuator, and also for outgoing signal lines.

The electric motor prime mover for the actuator comprises an electric motor 38 mounted on the gear case plate 28, which motor may be a capacitor-start motor which is connected, in a well known manner, to a capacitor 40 which is supported on the motor 38 by means of a bracket 42.

The valve 12 is held in the position driven by the motor 38 by means of its connection thereto back through the output shaft and the gear train by means of a brake mechanism 44 which is connected to the opposite end of the output shaft of the motor. The brake mechanism 44 is mounted to the motor by means of a bracket 46 and includes an electromagnetic solenoid 48 having an extensible member 49 which moves outwardly as viewed in FIG. 2 to pivot a lever 50 and in turn pivot a pivot plate 51 clockwise as viewed in FIG. 2 against the bias of a spring 52 when energized with the electric drive motor 38. Pivoting of the plate 51 releases a brake band 54 which embraces a brake drum 56 mounted on the end of the motor shaft.

The lower end (not shown) of the motor shaft is connected by way of a gear train 58 to an intermediate shaft 72 which is rotatably mounted at 74 and 76 in the gear case plate 28 and the top plate 20, respectively, and which is axially aligned with an output shaft 78 which is rotatably mounted in the intermediate shaft 72 by way of an end projection 120 in a bearing 122, and which is rotatably mounted at the lower end of the housing 22 in a bearing 80. The gear train 58 includes a shaft 60 which is rotatably mounted in a bearing 62 in the gear case plate 28 and in a bearing 64 in the top plate 20, and which carries a gear 66 which is directly connected to the gear on the motor output shaft, or indirectly connected thereto by way of other gears, and a gear 68 which engages a gear 70 carried by the intermediate shaft 72.

The output shaft 78 is also rotatably mounted at the bottom of the cylinder housing 23 in a bearing 82 and includes a portion 84 which is connected to a valve stem 86. Of course, the connection between the shaft portion 84 and the valve stem 86 may be a wide variety of constructions, depending on the particular valve.

With a clutch 114, which will be discussed below, conditioned to effect engagement between the intermediate shaft 72 and the output shaft 78, and with the drive motor energized to effect rotation of the output shaft 78, the valve will be driven by the motor toward a first position, for example a closed position. At the desired position, means must be provided to deenergize the electric motor. These means include a switch 100 which is operated by a cam mechanism carried by the output shaft 78. The cam mechanism comprises a rod 90 which extends freely through an axial bore 92 in the intermediate shaft 72 and which has its lower end fixed in an axial bore 88 in the output shaft 78. Therefore, as the output shaft 78 rotates, the rod 90 rotates the same amount. The rod 90 carries a cam 96 which operates the switch 100, as indicated in FIG. 2, when the drive motor has driven the output shaft 78 to a position just short of that of the desired position, the difference depending on the inertia of the system. A second cam 94 is carried by the rod 90 and is provided to operate a second switch 98 for signaling purposes or the like, for example to light a supervisory lamp.

Deenergization of the electric drive motor 38 is accompanied, as discussed above, by deenergization of the electromagnetic solenoid 48 of the brake mechanism 44 so that the valve is held in the desired position by the brake band 54 and the brake drum 56.

As the valve is being driven toward the desired position, energy is stored in a spring 102 for subsequent release to drive the valve in the opposite direction, for example to its closed condition, assuming decoupling of the clutch 114 so that all of the spring energy is directed to drive the valve, rather than to driving the electric motor 38 in the reverse direction through the intermediate shaft 72 and the gear train 58. The spring 102 includes an upper end 112 which is secured to the housing 22 (not shown) so that the same is fixed with respect to the output shaft 78. The spring 102 includes a lower end 104 which is positioned in a slot 106 in an enlarged portion 108 of the output shaft 78 so that the lower end of the spring rotates with the output shaft 78.

In order to engage and disengage the intermediate shaft 72 and the output shaft 78 a clutch 114 is provided as illustrated in FIGS. 1, 3 and 4. The intermediate shaft 72 includes a lower end 116 which has the same diameter as an upper end 118 of the output shaft 78. The upper end of the shaft portion 116 has a flange which defines a shoulder 124 and a flat torsion spring 126 includes an upper end which bears against the shoulder 124. The torsion spring 126 embraces the shaft portion 116 and the shaft portion 118 and has a lower end 128 which is received in a slot 130 of a gear 132 which is rotatable about the shaft portion 118 and which rests on a flange 143. The spring 126 has a normal inner diameter that is less than the diameters of the shaft portions 116 and 118 so as to tightly embrace these shaft portions and is wound in such a direction so as to tighten upon initiation of rotation of the intermediate shaft 72 and sensing of the resulting relative rotation of the shaft 72 with respect to the shaft 78. The shafts 72 and 78 are therefore coupled in driving engagement upon operation of the electric drive motor 38.

If the lower end of the spring becomes fixed and rotation occurs in the opposite direction, the spring expands its inner diameter to release this coupling. Fixing of the lower end is accomplished by an electromagnetic mechanism which fixes and releases the gear 132 with respect to rotation about the output shaft 78. The electromagnetic mechanism comprises an electromagnetic solenoid 134 having an extensible member 136 which includes a slot 142 therein for receiving an end of a level 140, the end being secured in the slot 142 by means of a cotter pin 138 or other suitable fastening means. As schematically illustrated in FIG. 4, the solenoid and the other supporting structure of the gear engaging mechanism is secured to the housing 122 and is not rotatable. The solenoid level 140 is pivotally mounted (not shown) and pivots a dog lever 144 having a dog 146 which is pivoted at 148 under the bias of a spring 150 connected to a spring bracket 152. With the extensible member 136 in its non-extended position, the dog 146 is rotated into engagement with the teeth of the gear 132 to prevent rotation of the gear. In the extended position of the member 136 (as indicated by broken lines in FIG. 4) the dog 146 is moved out of engagement with the teeth of the gear 132 so that the same is free to rotate with the shaft portion 118. Therefore, engagement between the dog 146 and the gear 132 effects disengagement of the clutch 114, while disengagement of the dog and gear effects engagement of the clutch 114. Inasmuch as engagement of the clutch 114 corresponds to the electric motor driving condition and to disengagement of the dog 146 and gear 132, the solenoid 134 is operated during the electric motor driving operation to extend the member 136.

In FIG. 3 a portion of the mounting bracket 141 for the clutch level 140 is illustrated. An adjacent screw 143 is provided to adjust the position of the lever 140 with respect to the bracket 141. In FIG. 4, the dog lever 144 includes a hole, which may also be in the form of an arcuate slot, to receive a pin 147 which drives the dog lever 144. The hole 145 and the bias spring 150 ensure that the dog is disengaged from the teeth of the gear 132 in the electric motor driving mode of operation.

Turning now to FIGS. 1 and 5, a mechanism is illustrated for providing positive limits of valve rotation, smooth actuator operation, and less impact than the stop apparatus provided in my aforementioned patent. As can be seen in the drawings, the output shaft portion 84 carries a pinion 154 which is keyed thereto at 156 and 158. The pinion 154 is meshed in driving engagement with a rack 160 which is formed on a piston 162. The piston 162 is slidably carried in a cylinder bore 164 formed in a wall 166 of the cylinder housing 23. A pair of end plugs 168 and 170, which may be threaded type plugs, are secured to the ends of the cylinder bore 164 and sealed thereto at 172 and 174.

The piston slides in fluid sealed engagement with the bore 164, the sealing being provided by means of seals 176 and 178.

The piston 162 includes an axial bore 180 therethrough for passing liquid as the piston is driven through the bore 164. The axial bore 180 may include a threaded portion for receiving a threaded plug 184 having a metering orifice therein. A plurality of such plugs, each having a different size orifice, may be utilized for controlling fluid flow and the rate of valve operation.

As the valve is operated from one position to the next, the cylinder slows the operation, particularly near the end of the operation in that the electric motor may be deenergized before reaching the desired valve position and coasts to a stop and the spring motor has almost fully expended its energy during reverse operation so that the piston may strike the end plugs 168 and 170 with less force than heretofore experienced. If the end plugs are threaded, an adjustment of these positive stops is provided. FIG. 6 illustrates a cylinder wall 167 having a threaded portion 175 for receiving the threads 173 of an end plug 171.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A clutch mechanism for a valve actuator, said clutch mechanism comprising:
   first and second axially aligned and rotatably mounted shafts having adjacent end portions of the same diameter;
   a first shoulder on said first shaft;
   a second shoulder on said second shaft;
   a gear having a central bore receiving said second shaft therethrough, said gear abutting said second shoulder and rotatable about said second shaft;
   a torsion spring about said end portions of said first and second shafts and having a normal diameter that is less than the diameter of said end portions of said first and second shafts, said spring having one end bearing against said first shoulder and a second end connected to said gear, said torsion spring operable to tighten upon and couple said shafts for mutual rotation in response to rotation of said first shaft in a first direction; and
   clutch disengagement means including gear engagement means for engaging the teeth of said gear to prevent rotation with said second shaft so that rotation of said second shaft in the opposite direction causes an expansion of the diameter of said spring and disengagement of said shafts.

2. A clutch mechanism according to claim 1, wherein said gear engagement means comprises:
   a pivotally mounted dog;
   biasing means biasing said dog out of engagement with said gear; and
   dog operating means connected to said dog and operable to move said dog into engagement with said gear.

3. A clutch mechanism according to claim 2, wherein said dog operating means comprises:
   a solenoid including an extensible member;
   a lever connected to said extensible member; and
   means connecting said lever to said dog.

4. A clutch mechanism according to claim 2, wherein said biasing means includes a spring having one end fixed and the other end connected to said dog.

5. A fail-safe valve actuator comprising:
   a rotatably mounted output shaft for connection to a valve;
   a drive motor operable in a first direction;
   a gear train connected to said drive motor;
   an intermediate shaft connected to said gear train, said intermediate shaft rotatably mounted adjacent and in axial alignment with said output shaft,
   said output and intermediate shafts having adjacent end portions of the same diameter and respective shoulders spaced from the adjacent ends;

a clutch gear mounted and rotatable about said adjacent end portion of said output shaft bearing against the respective shoulder;

a first torsion spring about said end portions connected to said gear and bearing against the shoulder of said intermediate shaft, said first torsion spring having a normal diameter that is less than the diameter of said end portions of said shafts and responsive to rotation of said intermediate shaft in the first direction to couple said shafts for mutual rotation;

a second torsion spring including a fixed end and an end connected to said output shaft to store energy as said output shaft is rotated in the first direction and serving as a second motor to drive said output shaft in a second direction;

a brake connected to and operated upon deenergization of said drive motor to hold the above components and the valve in steady state and deenergizable to permit said second torsion spring to release its energy and rotate the output shaft in the second direction; and gear engaging means operable upon deenergization of said brake to engage said gear and prevent rotation thereof to cause expansion of the diameter of said first torsion spring and uncoupling of said shafts so that said drive motor is disconnected during operation in the second direction.

6. The fail-safe actuator of claim 5, wherein said gear engaging means comprises:

a pivotally mounted lever;

a projection extending from said lever toward said gear for engaging the teeth of said gear;

bias means connected to said lever to normally maintain said projection and said gear disengaged; and lever operating means for pivoting said lever to cause engagement of said gear by said projection.

7. The fail-safe actuator of claim 6, wherein said lever operating means comprises a solenoid device including a reciprocable member attached to said lever.

8. The fail-safe actuator of claim 5, comprising:

stop means connected to said output shaft defining limits of rotation of said output shaft.

9. The fail-safe actuator of claim 8, comprising a pinion carried on said output shaft, and wherein said stop means comprises:

a hollow cylinder, including first and second closed ends, for containing a fluid;

a piston slidably mounted in said cylinder;

a rack on said piston in engagement with said pinion; and an axial fluid passageway through said piston for passing the liquid therethrough as said pinion moves said rack and said piston, said closed ends defining positive stops.

10. The fail-safe actuator of claim 9, wherein said passageway includes a threaded portion, and comprising a threaded insert in said threaded portion including a metering orifice for the fluid passing therethrough.

11. The fail-safe actuator of claim 10, wherein the inner wall of said cylinder is threaded and said ends include threaded plugs as stop adjustments.

12. A mechanism for a valve actuator, said mechanism comprising:

first and second axially aligned and rotatably mounted shafts having adjacent end portions of the same diameter;

a first shoulder on said first shaft;

a second shoulder on said second shaft;

a gear having a central bore receiving said second shaft therethrough, said gear abutting said second shoulder and rotatable about said second shaft;

a torsion spring about said end portions of said first and second shafts and having a normal diameter that is less than the diameter of said end portions of said first and second shafts, said spring having one end bearing against said first shoulder and a second end connected to said gear, said torsion spring operable to tighten upon and couple said shafts for mutual rotation in response to rotation of said first shaft in a first direction;

clutch disengagement means including gear engagement means for engaging the teeth of said gear to prevent rotation with said second shaft so that rotation of said second shaft in the opposite direction causes an expansion of the diameter of said spring and disengagement of said shafts; and damping means connected to said second shaft, said damping means including means for controlling the speed of rotation of said second shaft.

13. The mechanism of claim 12 comprising:

stop means connected to said second shaft defining limits of rotation of said second shaft.

14. The mechanism of claim 12, wherein said means for controlling the speed of rotation of said second shaft comprises:

a pinion carried by and rotatable with said second shaft;

a hollow cylinder for containing a fluid, the cylinder comprising closed ends;

a piston slidably mounted in said hollow cylinder;

a fluid passageway extending axially through said piston for the passage of fluid therethrough as said piston moves; and a rack on said piston engaging and driven by said pinion, said passageway metering the flow of fluid therethrough and said ends defining positive stops for said piston.

15. The mechanism of claim 14, wherein said passageway comprises a threaded portion, and further comprising a plurality of threaded plugs each having a different size metering orifice therein for changing the flow rate of the fluid and adjusting the speed of rotation of said second shaft.

* * * * *